(12) United States Patent
Vanstone

(10) Patent No.: US 8,631,240 B2
(45) Date of Patent: Jan. 14, 2014

(54) COMPRESSED ECDSA SIGNATURES

(75) Inventor: Scott A. Vanstone, Campbellville (CA)

(73) Assignee: Certicom Corp., Mississauga (CA)

( * ) Notice: Subject to any disclaimer, the term of this patent is extended or adjusted under 35 U.S.C. 154(b) by 1358 days.

(21) Appl. No.: 11/939,022

(22) Filed: Nov. 13, 2007

(65) Prior Publication Data

US 2010/0023775 A1 Jan. 28, 2010

Related U.S. Application Data

(60) Provisional application No. 60/865,544, filed on Nov. 13, 2006.

(51) Int. Cl.
*H04L 29/06* (2006.01)

(52) U.S. Cl.
USPC ............................. 713/175; 713/176

(58) Field of Classification Search
USPC .............. 380/255, 28, 30; 713/156, 175, 176, 713/180
See application file for complete search history.

(56) References Cited

U.S. PATENT DOCUMENTS

| | | | |
|---|---|---|---|
| 5,054,088 A | 10/1991 | Gunderson et al. | |
| 6,011,873 A | 1/2000 | Desai et al. | |
| 6,356,937 B1 | 3/2002 | Montville et al. | |
| 6,757,827 B1 | 6/2004 | Geist | |
| 2001/0008013 A1* | 7/2001 | Johnson et al. | 713/170 |
| 2002/0108042 A1 | 8/2002 | Oka et al. | |
| 2003/0123697 A1 | 7/2003 | Mita et al. | |
| 2005/0041811 A1* | 2/2005 | Kobayashi et al. | 380/255 |
| 2006/0209789 A1 | 9/2006 | Gupta et al. | |
| 2007/0064932 A1 | 3/2007 | Struik et al. | |

FOREIGN PATENT DOCUMENTS

EP 1056053 A2 11/2000

OTHER PUBLICATIONS

Menezes, Alfred J. et al.; Handbook of Applied Cryptography; 1997; pp. 451 to 460; CRC Press LLC.
Hankerson, Darrel et al.; Guide to Elliptic Curve Cryptography; 2004, pp. 9 to 11, 183 to 186; Springer-Verlag; New York.
PCT Search Report from PCT/CA2007/002023 completed Feb. 14, 2008.
Bleichenbacher, Daniel; "Compressing Rabin Signatures"; Jan. 30, 2004; Topics in Cryptology A CT-RSA 2004; pp. 126 to 128; *Lecture Notes in Computer Science*; Springer; Berlin; ISBN 978-3-540-20996-4.
Johnson, D. et al.; "The Elliptic Curve Digital Signature Algorithm (ECDSA)"; Aug. 1, 2001; pp. 36 to 63; International Journal of Information Security; vol. 1, No. 1; Certicom Corp. White Paper; Published on-line Jul. 27, 2001; ISBN 1615-5262.

(Continued)

*Primary Examiner* — Edward Zee
(74) *Attorney, Agent, or Firm* — John R. S. Orange; Blake, Cassels & Graydon LLP

(57) ABSTRACT

An improved compression scheme for compressing an ECDSA signature is provided. The scheme substitutes the integer s in a signature (r, s) by a smaller value c. The value c is derived from s and another value d, d being small enough such that c is smaller than s. The compressed signature (r, c) is verified by computing a value using r and e, e being a hash of a message m, and using this value with a value R recovered from r to derive the value d. The value s can then be recovered and the full signature then recovered and verified.

19 Claims, 2 Drawing Sheets

Signer 12 generate $(r, s)$ and $m$ derive $c$ substitute $s$ with $c$ $(r, c), m$ ⟶ $(r, c), m$ Verifier 14 compute $e = H(m)$ compute $W = eP + rQ$ $x = \log_W(cR)$ $s = c / x \bmod n$ obtain $(r, s)$ and verify if desired

(56) References Cited

OTHER PUBLICATIONS

Di Felice, M.; Supplementary Search Report from corresponding European Application No. 07845497.2; search completed Oct. 6, 2010.

Antipa, A. et al.; "Accelerated Verification of ECDSA Signatures"; Proceedings of Selected Areas in Cryptography—SAC2005; Lecture Notes in Computer Science.; 2006; pp. 307 to 318, vol. 3897; Springer-Verlag; New York.

Malone-Lee, J. et al.; "Modifications of ECDSA"; Proceedings of Selected Areas in Cryptography—SAC2002; Lecture Notes in Computer Science; Aug. 2002; pp. 1 to 12; SAC2002; vol. 2592; Springer-Verlag; London.

Torii et al.; "$21^{st}$ century nimuketa Kenkyuu Kaihatsu Daen Kyokusen Angou"; Jul. 9. 1999; pp. 197 to 201; vol. 50, No. 4: Fujitsu Corporation; Futjitsu, Japan.

English-language translation of Torii et al., "Research and Development for $21^{st}$ Century Elliptic curve cryptography", 1999.

\* cited by examiner

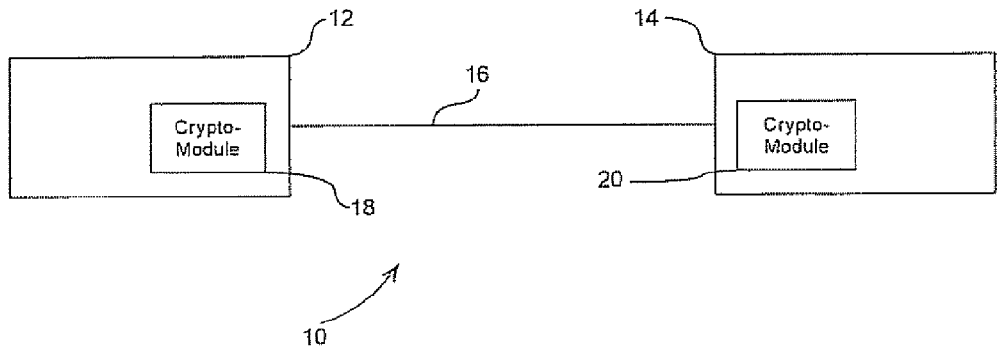

Signer 12                                           Verifier 14 generate ($r$, $s$) and $m$ derive $d$ substitute $s$ with $d$ ($r$, $d$), $m$ ⟶ ($r$, $d$), $m$ compute $e = H(m)$ compute $W = eP + rQ$ $c = \log_R(dW)$ $s = c / d \bmod n$ obtain ($r$, $s$) and verify if desired

Figure 3

COMPRESSED ECDSA SIGNATURES

This application claims priority from U.S. Provisional Patent Application No. 60/865,544 filed on Nov. 13, 2006.

FIELD OF THE INVENTION

The present invention relates to cryptographic schemes and has particular utility in digital signature algorithms.

DESCRIPTION OF THE PRIOR ART

A digital signature of a message is a number dependent on some secret known only to the signer, and, additionally, on the content of the message being signed. Signatures are meant to be verifiable. If a dispute arises as to whether a party signed a document (caused by either a signer trying to repudiate a signature it did create, or a fraudulent claimant), an unbiased third party should be able to resolve the matter equitably, without requiring access to the signer's secret information (e.g. a private key).

Digital signatures have many applications in information security, in particular, as they are used in cryptographic schemes. Some applications include authentication, data integrity, and non-repudiation. One particularly significant application of digital signatures is the certification of public keys in large networks. Certification is a means for a trusted third party to bind the identity of a user to a public key, so that at some later time, other entities can authenticate a public key without assistance from the trusted third party.

A cryptographic scheme known as the Digital Signature Algorithm (DSA) is based on the well known and often discussed intractability of the discrete logarithm problem. The DSA was proposed by the U.S. National Institute of Standards and Technology (NIST) in 1991 and has become a U.S. Federal information Processing Standard (FIPS 186) called the Digital Signature Standard (DSS). The algorithm is a variant of the well known ElGamal signature scheme, and can be classified as a digital signature with appendix (i.e. one that relies on cryptographic hash functions rather than customized redundancy functions).

The Elliptic Curve Digital Signature Algorithm (ECDSA) is a signature scheme that may be used in elliptic curve cryptosystem and has attributes similar to the DSA. It is generally regarded as the most widely standardized elliptic curve-based signature scheme, appearing in the ANSI X9.62, FIPS 186-2, IEEE 1363-2000 and ISO/IEC 15946-2 standards as well as several draft standards.

ECDSA signature generation operates on several domain parameters, a private key d, and a message m. The outputs are the signature (r, s), where the signature components r and s are integers, and proceeds as follows.

1. Select a random integer $k \in_R [1, n-1]$, n being one of the domain parameters.
2. Compute $kP = (x_1, y_1)$ and convert $x_1$ to an integer $\bar{x}_1$, where P is a point on an elliptic curve E and is one of the domain parameters.
3. Compute $r = \bar{x}_1 \mod n$, wherein if $r=0$, then go back to step 1.
4. Compute $e = H(m)$, where H denotes a cryptographic hash function whose outputs have a bit length no more than that of n (if this condition is not satisfied, then the outputs of H can be truncated).
5. Compute $s = k^{-1}(e + \alpha r) \mod n$, where $\alpha$ is a long term private key of the signor. If $s=0$, then go back to step 1.
6. Output the pair (r, s) as the ECDSA signature of the message m.

ECDSA signature verification operates on several domain parameters, a long term public key Q where $Q = \alpha P$, the message m, and the signature (r, s) derived above. ECDSA signature verification outputs a rejection or acceptance of the signature, and proceeds as follows.

1. Verify that r and s are integers in the interval [1, n-1]. If any verification fails then a rejection is returned.
2. Compute $e = H(m)$.
3. Compute $w = s^{-1} \mod n$.
4. Compute $u_1 = ew \mod n$ and $u_2 = rw \mod n$.
5. Compute $R = u_1 P + u_2 Q = s^{-1}(eP + rQ)$ (from 3 and 4 above)
6. If $R = \infty$ then the signature is rejected.
7. Convert the x-coordinate $x_1$ of R to an integer $\bar{x}_1$; Compute $v = \bar{x}_1 \mod n$.
8. If $v = r$ then the signature is accepted, if not then the signature is rejected.

To improve the efficiency of ECDSA signature verification, in particular step 5 above that includes an inversion of s, the ECDSA signature has been known to be compressed by truncating s by omitting 2b bits. Such compression is at the cost of additional verification steps, which has been known to cost the verifier approximately $2^{2b}$ extra elliptic curve group operations.

Signature compression is particularly desirable in cryptographic applications where bandwidth conservation is of paramount importance, and additional cryptographic operations can be readily handled by the verifier. An example is a two-dimensional barcode, where bandwidth is very limited, but the verifier processor may be fast. Another example is RFID tags, which need power from a radio frequency field in order to transmit data, and therefore low transmission bandwidth is very desirable.

A scheme for ECDSA signature compression is needed that has a cost to the verifier that is less than such previous compression schemes.

it is therefore an object of the present invention to obviate or mitigate at least one of the above-mentioned disadvantages.

SUMMARY OF THE INVENTION

In one aspect, there is provided a method of compressing a digital signature of a message, the signature comprising a pair of signature components r, s, the method comprising obtaining a pair of values c, d, related mathematically to s and with one of the values being smaller than s, substituting the one value for the signature component s, in the digital signature and forwarding the signature to a recipient.

In another aspect, there is provided, a cryptographic system for generating a compressed signature from a pair of signature components r, s, the system having an arithmetic unit to provide a pair of values c, d mathematically related to the component s, and a signature generator to substitute one of the values for the signature s.

In yet another aspect, there is provided a cryptographic system for verifying a signature r, c received from a sender using a system as defined above comprising an arithmetic unit to recover the other of the values and compare the other value with predefined criteria.

In yet another aspect, a method of compressing a digital signature (r, s) is provided that includes the steps of substituting the value s with a smaller value c, the value c being derived from s and another value d, the value d being small enough such that c is smaller than s; and substituting the value s with the value c to obtain a compressed signature (r, c).

In yet another aspect, a method of verifying a compressed signature is provided, the compressed signature including a value c substituted for a value s of a full signature (r, s), the method comprising the steps of computing a value d using parameters of the compressed signature and a message, the value c being derived from the value d and the value s; and verifying the compressed signature if a value for d can be found according to predetermined criteria.

BRIEF DESCRIPTION OF THE DRAWINGS

An embodiment of the invention will now be described by way of example only with reference to the appended drawings wherein:

FIG. 1 is a cryptographic communication system;

FIG. 2 is a flow chart illustrating one embodiment of a signature compression scheme and a signature verification scheme of a compressed signature; and FIG. 3 is flow chart illustrating another embodiment of a signature compression scheme and a signature verification scheme of a compressed signature.

DETAILED DESCRIPTION OF THE INVENTION

Referring therefore to FIG. 1, a cryptographic communication system is generally denoted by numeral 10. The system 10 has a first correspondent 12 and a second correspondent 14 that may communicate with each other over a communication channel 16. The communication channel 16 may or may not be secure. Each correspondent has a cryptographic module 18 and 20 respectively, for performing cryptographic operations.

Each cryptographic module 18 and 20 is capable of performing elliptic curve cryptographic operations such as ECDSA signature generation and verification schemes operating on the elliptic curve E defined over a field $F_q$. The embodiments described herein are particularly suitable for an ECDSA algorithm where, for example, the integers in the signature (r, s) can be compressed at the cost of the verifier needing to perform additional cryptographic operations.

In a first embodiment exemplified in FIG. 2, the correspondent 12 may be referred to as a "signer", and the correspondent 14 may be referred to as a "verifier". An ECDSA signature (r, s), generated by the signer 12 for a message m, is produced as described above. To reduce bandwidth, the signature can be compressed by substituting, for example s, by a smaller value c. The values s and c in this example are related by the expression $$s \equiv \frac{c}{d} \bmod n,$$

the value of d being chosen such that c is a smaller value than s. The possible range of values or 'bounds' for d is part of the system parameters and is used in the verification step for determining if a recovered d is acceptable.

Values for c and d may be obtained by using a variant of the extended Euclidean algorithm to find an equation of the form ds+un=c. More precisely, the intermediate steps in the extended Euclidean algorithm compute values x, y, z such that xs+yn=z. Normally, the extended Euclidean algorithm begins with small x and y (valued at 0 or 1) and large z (as large as n or s), and ends with large x and y (about the size of n and s respectively) and small z (usually 1, unless n and s have a common factor which will not occur for the choice of n and s in ECDSA). In the present embodiment, the extended Euclidean algorithm is stopped part way, to obtain values of x and y that are intermediate in size, and meet the requirements for d and c, respectively.

The value obtained for c is substituted for s in the signature to provide the compressed signature (r, c). This is then sent from the signer to a recipient.

The compressed signature (r, c) may be verified by a recipient by computing a point R, where R can be recovered from r. Recovering R from r may provide several possibilities for R, in which case, the following verification scheme may be attempted by the verifier 14 for each such R. Alternatively, extra information may be sent with, or embedded in, the signature or message m to indicate which of the possible values is the correct choice for R. This may be, for example, the first bit of the value of the y co-ordinate of R or a similar technique. For each such R, the full signature (r, s) is valid, by definition, if and only if $R=s^{-1}(eP+rQ)$, which according to the above notation, is equivalent to $cR=d(eP+rQ)$.

To verify the signature (r, c), the verifier 14 first computes $W=eP+rQ$ which can be done using public information available to the recipient. As discussed above, e is generally computed as a hash of the message m, e.g. $e=H(m)$. The verifier 14 then attempts to compute $d=\log_W(cR)$, using knowledge that d is smaller than a predetermined bound agreed by the signer and verifier for purposes of signature compression. If no such d can be found within the bound, then the compressed signature (r, c) is rejected as being invalid. Similarly, if a value of d is obtained that meets the bounds agreed, the signature may be considered verified. Such discrete logarithm algorithms generally take time proportional to $\sqrt{d}$. If $\sqrt{d}$ is small enough, then it is quite practical for the verifier 14 to use such an algorithm. Once (and if) d is obtained by the verifier 14, the full signature (r, s) can be recovered by computing s=c/d mod n, allowing the verifier 14 to also use or verify the full signature if he wishes.

In another embodiment shown in FIG. 3, the compressed signature may be (r, d), where d is the value d used in the above notation, and in this case, a recovered value of c is required to meet a particular range of sizes, i.e. be "small enough".

Similar to the above embodiment, the value $W=eP+rQ$ is first computed, and then the verifier 14 attempts to compute $c=\log_R(dW)$ using any suitable method for choosing R, which can be done if c is small enough. If no such c can be found, then the compressed signature (r, d) is rejected as being invalid. Once (and if) c is obtained, the signature may be considered to be verified although the full signature (r, s) can be recovered by computing s=c/d mod n, if the verifier 14 wishes to use or verify the full signature (r, s).

In many practical applications, the choice of R can often be narrowed down to a choice between two values, e.g. R and −R, given r alone. In general, algorithms for solving discrete logarithms between R and some point W will also find a logarithm between −R and W, because if the first logarithm is, e.g., u, the other is −u. Typically, it is easy to check that −u is small enough, so it is generally sufficient to compute one discrete logarithm per pair (R, −R) of candidates.

The above compression scheme may effectively compress an ECDSA signature by removal of 2b bits at the cost of the verifier 14 performing an extra $2^b$ elliptic curve group operations, where b is a predetermined value selected by the signer. With known compression techniques the cost of saving 2b bits was $2^{2b}$ extra signature verifications, which is considerably more costly for moderate sizes of b.

It should be noted that verification, compression and decompression of an ECDSA signature (r, s) can be done without using the private key. From a security perspective, this means that a compressed ECDSA signature is largely guaranteed to be as secure as a full signature, since the private key is not needed to compress or decompress the full signature. From a practical perspective, this means that third parties can provide services using methods that may include the schemes described above to verify a compressed signature. For example, a CA may act as an intermediary to compress signatures created by a signor and forward those to recipients, where they may be verified.

Although the invention has been described with reference to certain specific embodiments, various modifications thereof will be apparent to those skilled in the art without departing from the spirit and scope of the invention as outlined in the claims appended hereto. For example, the technique may be used with other discrete log signature algorithms where an ephemeral private key is used to generate a first signature component that is then bound to the message and the long term private of the signer to produce a second signature component.

The invention claimed is:

1. A method of compressing a digital signature of a message, said signature comprising a pair of signature components r, s, said method being performed by a correspondent in a data communication system, the correspondent having a cryptographic module for performing cryptographic operations, said method comprising:
   said cryptographic module obtaining a pair of values c, d related mathematically to s, one of said values being smaller than s and said one of said values having a smaller number of bits than s, the other of said values being required to fall within predefined bounds;
   said cryptographic module generating a compressed signature by substituting said one of said values for the signature component s, in said digital signature; and
   said correspondent forwarding said compressed signature to a recipient.

2. The method according to claim 1 wherein both said values c, d meet predetermined criteria.

3. The method according to claim 1 wherein said value c is smaller than said component s.

4. The method according to claim 3 wherein said components r, s represent an ECDSA signature.

5. The method according to claim 1 wherein s, c, and d are related such that s≡c/d mod n.

6. The method according to claim 5 where said values c, d are obtained to meet predetermined criteria.

7. The method according to claim 6 wherein said values c, d are obtained by application of an extended Euclidean algorithm and iterations of said algorithm are terminated when said predetermined criteria are met.

8. The method according to claim 5 wherein said one of said values corresponds to c.

9. The method according to claim 5 wherein said one of said values corresponds to d.

10. The method according to claim 1, wherein said signature component r is obtained from an integer k and said signature component s binds said integer k, a long term private key α and said signature component r to said message.

11. A method of verifying a compressed signature, said method of verifying said compressed signature being performed by a correspondent in a data communication system, the correspondent having a cryptographic module for performing cryptographic operations, said method of verifying said compressed signature comprising:
   said cryptographic module obtaining said compressed signature, said compressed signature generated from a digital signature of a message, said digital signature having signature components r,s, said compressed signature having signature components r and one of a pair of values c,d, said values c,d related mathematically to s, one of said values being smaller than s and said one of said values having a smaller number of bits than s, the other of said values being required to fall within predefined bounds;
   said cryptographic module recovering from said compressed signature said other of said values; and
   said cryptographic module determining whether said recovered other of said values meets predefined criteria.

12. The method of verifying a compressed signature according to claim 11 wherein recovery of said other of said values is obtained from combining said signature components of said compressed signature.

13. The method of verifying a compressed signature according to claim 12 wherein an intermediate value is obtained from said message and combined with values obtained from said signature components of said compressed signature to recover said other of said values.

14. The method of verifying a compressed signature according to claim 11 wherein said predefined criteria comprises said recovered other of said values being required to fall within the predefined bounds.

15. The method of verifying a compressed signature according to claim 11 further comprising:
   said cryptographic module rejecting said compressed signature if said recovered other of said values does not meet said predefined criteria; and
   said cryptographic module accepting said compressed signature if said recovered other of said values meets said predefined criteria.

16. The method of verifying a compressed signature according to claim 15 wherein a further verification is performed on an original signature obtained from application of said one of said values and said recovered other of said values to said compressed signature.

17. A cryptographic system for generating a compressed signature from a digital signature, said digital signature comprising a pair of signature components r, s, said system comprising:
   an arithmetic unit to provide a pair of values c, d mathematically related to said component s, one of said values being smaller than s and said one of said values having a smaller number of bits than s, the other of said values being required to fall within predefined bounds; and
   a signature generator to substitute said one of said values for said signature component s, in said digital signature.

18. A cryptographic system for verifying a compressed signature sender generated using the system according to claim 17, said cryptographic system comprising an arithmetic unit to recover said other of said values and compare said other of said values with predefined criteria.

19. The cryptographic system according to claim 17, wherein said signature component r is obtained from an integer k and said signature component s binds said integer k, a long term private key α and said signature component r to said message.

* * * * *